(12) United States Patent
Ohtsuji

(10) Patent No.: US 11,561,924 B2
(45) Date of Patent: Jan. 24, 2023

(54) INFORMATION PROCESSING DEVICE AND NON-TRANSITORY COMPUTER-READABLE STORAGE MEDIUM FOR STORING RECEPTION PROCESSING PROGRAM

(71) Applicant: FUJITSU LIMITED, Kawasaki (JP)

(72) Inventor: Hiroki Ohtsuji, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 31 days.

(21) Appl. No.: 17/167,126

(22) Filed: Feb. 4, 2021

(65) Prior Publication Data

US 2021/0374089 A1 Dec. 2, 2021

(30) Foreign Application Priority Data

May 29, 2020 (JP) .............................. JP2020-094011

(51) Int. Cl.
*G06F 15/173* (2006.01)
*G06F 5/12* (2006.01)

(52) U.S. Cl.
CPC .......... *G06F 15/17331* (2013.01); *G06F 5/12* (2013.01)

(58) Field of Classification Search
CPC ............................. G06F 15/17331; G06F 5/12
USPC ........................................................ 370/395
See application file for complete search history.

(56) References Cited

U.S. PATENT DOCUMENTS

| | | | |
|---|---|---|---|
| 2004/0148360 A1 | 7/2004 | Mehra et al. | |
| 2005/0132250 A1 | 6/2005 | Hansen et al. | |
| 2012/0198175 A1* | 8/2012 | Atkisson | G06F 3/0679 711/135 |
| 2013/0185475 A1* | 7/2013 | Talagala | G06F 12/0866 711/102 |

FOREIGN PATENT DOCUMENTS

| | | |
|---|---|---|
| JP | 2004-227568 A | 8/2004 |
| JP | 2005-182781 A | 7/2005 |

* cited by examiner

*Primary Examiner* — Emmanuel L Moise
*Assistant Examiner* — Zia Khurshid
(74) *Attorney, Agent, or Firm* — Fujitsu Patent Center

(57) ABSTRACT

An information processing device is configured to perform processing, the processing including: executing a persistence processing configured to make a part of a region persistent, the region being to be used as a ring buffer in remote direct memory access (RDMA) to a non-volatile memory accessible in an equal manner to a dynamic random access memory (DRAM) so as not to allow received data stored in the part of the region to be overwritten; executing a determination processing configured to determine whether a ratio of the region made persistent by the persistence processing has exceeded a first threshold; and executing a selection processing configured to select a method of evacuating the persistent received data by using a received data amount of the information processing device and a free region in the non-volatile memory in a case where the determination processing determines that the ratio has exceeded the first threshold.

9 Claims, 7 Drawing Sheets

INFORMATION PROCESSING DEVICE AND NON-TRANSITORY COMPUTER-READABLE STORAGE MEDIUM FOR STORING RECEPTION PROCESSING PROGRAM

CROSS-REFERENCE TO RELATED APPLICATION

This application is based upon and claims the benefit of priority of the prior Japanese Patent Application No. 2020-94011, filed on May 29, 2020, the entire contents of which are incorporated herein by reference.

FIELD

The embodiments discussed herein are related to an information processing device and a non-transitory computer-readable storage medium storing a reception processing program.

BACKGROUND

In recent years, use of non-volatile memories mapped into a memory space and accessible in an equal manner to dynamic random access memories (DRAMs) is increasing. Examples of such non-volatile memories include persistent memory devices in which the persistence and recoverability of storage I/O are combined with the speed and fine particle access of system memory, for example.

Furthermore, there is also a known technology in which a non-volatile memory unit receives checkpoint data from a main process and provides an access to the checkpoint data for use in a backup process, a recovery capability is supported in the event of a main process failure.

Examples of the related art include Japanese Laid-open Patent Publication No. 2004-227568 and Japanese Laid-open Patent Publication No. 2005-182781.

SUMMARY

According to an aspect of the embodiments, provided is an information processing device including: a memory; and a processor coupled to the memory, the processor being configured to perform processing. In an example, the processing includes: executing a persistence processing configured to make a part of a region persistent, the region being to be used as a ring buffer in remote direct memory access (RDMA) to a non-volatile memory accessible in an equal manner to a dynamic random access memory (DRAM) so as not to allow received data stored in the part of the region to be overwritten; executing a determination processing configured to determine whether a ratio of the region made persistent by the persistence processing has exceeded a first threshold; and executing a selection processing configured to select a method of evacuating the persistent received data on the basis of a received data amount of the information processing device and a free region in the non-volatile memory in a case where the determination processing determines that the ratio has exceeded the first threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

By performing a direct access (remote direct memory access (RDMA)) to such a non-volatile memory via a network, communication and persistence can be performed at the same time. Note that, in RDMA, a certain region of the memory is registered in advance in network hardware, and this certain region is used as a ring buffer for communication. Therefore, even when performing write by RDMA to a non-volatile memory accessible in an equal manner to the DRAM, content in the ring buffer needs to be copied to another location, and there is a problem that copying takes time.

Figure 7:
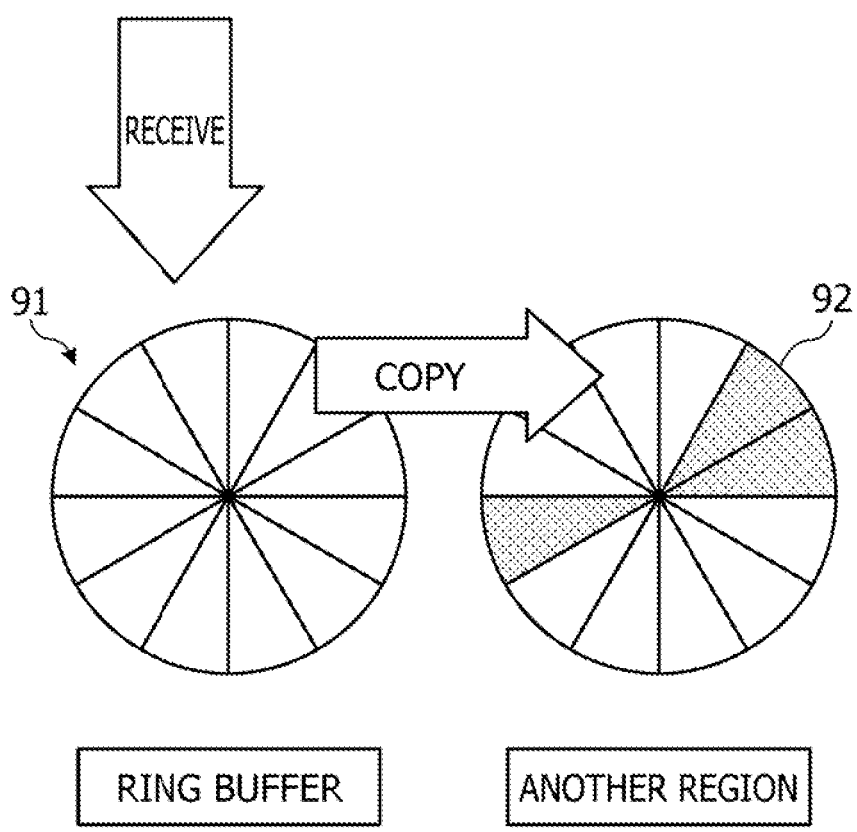
FIG. 7 is a diagram for describing a copy of a ring buffer.

FIG. 7 is a diagram for describing a copy of a ring buffer. As illustrated in FIG. 7, received data is stored in a ring buffer 91 and then copied to another region. Then, the region of the data copied to the another region becomes a persistence region 92 when persistence is instructed by a reception application.

According to an aspect of the embodiments provide a solution to reduce the time needed for copying the content in the ring buffer in RDMA to a non-volatile memory accessible in an equal manner to DRAM, and speed up the RDMA.

Hereinafter, embodiments of an information processing device and a reception processing program disclosed by the present application will be described in detail based on the drawings. Note that the embodiments do not limit the technology disclosed.

Embodiments

Figure 1:
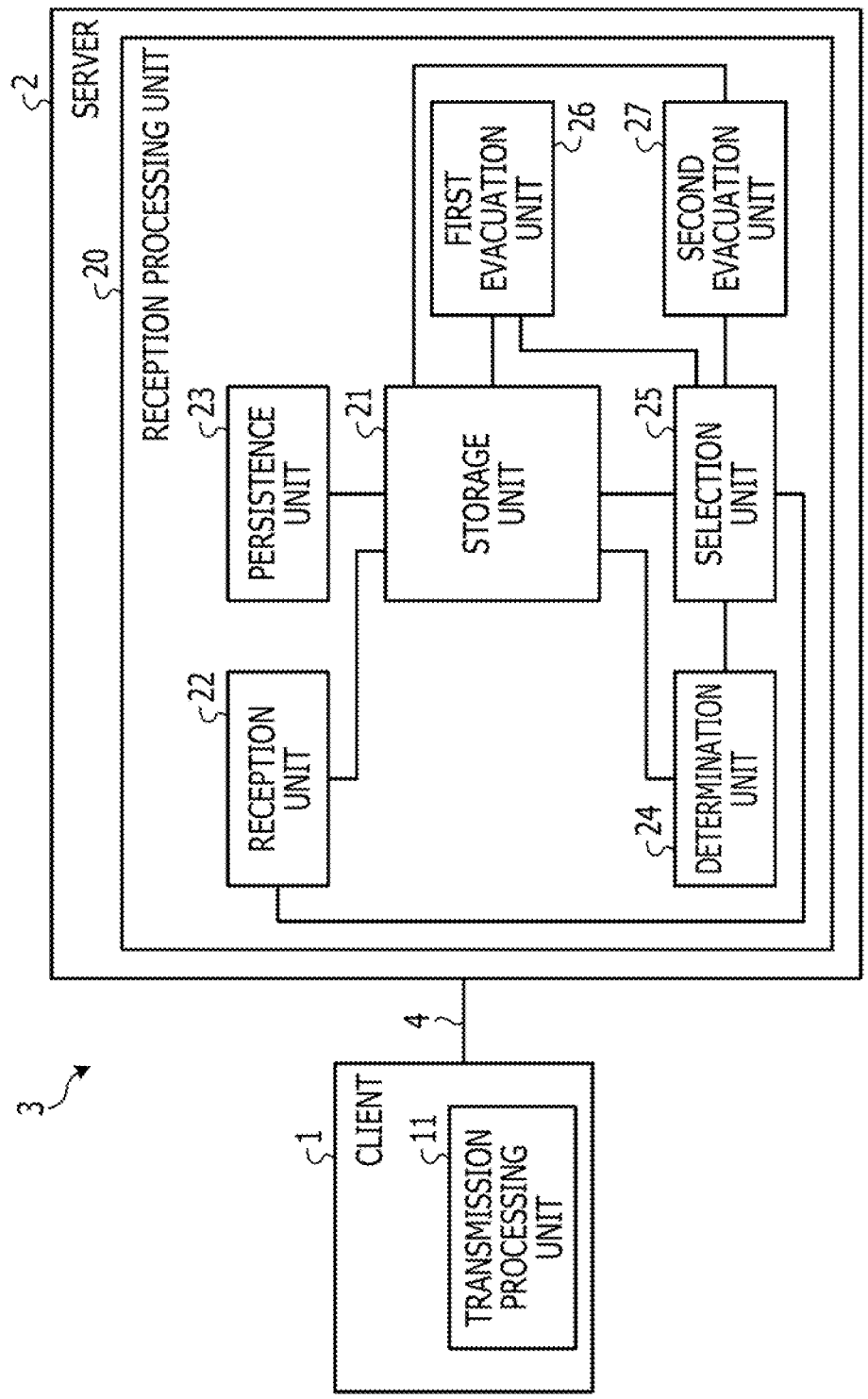
FIG. 1 is a diagram illustrating a configuration of a data transfer system according to an embodiment.

First, a data transfer system according to an embodiment will be described. FIG. 1 is a diagram illustrating a configuration of a data transfer system according to an embodiment. As illustrated in FIG. 1, a data transfer system 3 according to the embodiment includes a client 1 and a server 2. The client 1 and the server 2 are connected by a network 4.

The client 1 transmits data to the server 2 via the network 4. For example, the client 1 stores a copy of a file that the client 1 has in the server 2. The client 1 has a transmission processing unit 11. The transmission processing unit 11 transmits data to the server 2 using RDMA.

The server 2 includes a non-volatile memory mapped into a memory space and accessible in an equal manner to a DRAM. A non-volatile dual inline memory module (NVDIMM) is an example of such a non-volatile memory.

The server 2 includes a reception processing unit 20. The reception processing unit 20 receives the data transmitted by RDMA from the client 1 and stores the data in the non-volatile memory. The reception processing unit 20 is implemented by the server 2 executing a reception processing program. The reception processing unit 20 includes a storage unit 21, a reception unit 22, a persistence unit 23, a determination unit 24, a selection unit 25, a first evacuation unit 26, and a second evacuation unit 27.

The storage unit 21 stores the data transmitted from the client 1. A ring buffer used in RDMA communication is secured in the storage unit 21. The storage unit 21 is implemented by the non-volatile memory mapped into a memory space and accessible in an equal manner to a DRAM. Furthermore, the storage unit 21 stores a size S of the ring buffer, the number of messages N arriving per second by RDMA communication, a time $T_M$ needed for processing one message, a ratio P of received messages to be made persistent, and a time M needed for evacuating data from the ring buffer.

The reception unit 22 receives the data transmitted by the client 1 and stores the data in the ring buffer. The persistence unit 23 makes the data stored in the ring buffer persistent on the basis of an instruction from a reception application that uses the data transmitted by the client 1.

Figure 2:
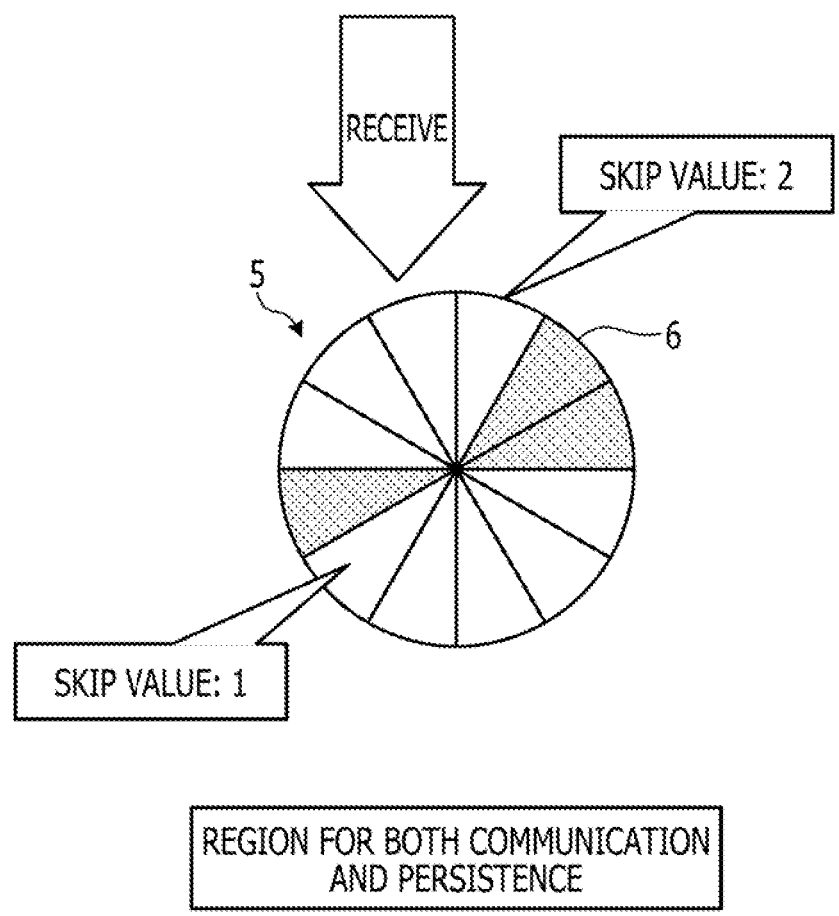
FIG. 2 is a diagram for describing persistence.

FIG. 2 is a diagram for describing persistence. As illustrated in FIG. 2, the data received by the reception unit 22 is stored in the ring buffer 5. The ring buffer 5 is a region for both communication and persistence. For example, the ring buffer 5 is a region used as a buffer for communication and a region where data is made persistent. The region where the data to be stored is made persistent is a persistence region 6.

The persistence region 6 becomes unable to be used as the buffer for communication. Therefore, a skip value is added to each entry in the ring buffer 5. The skip value indicates how many entries ahead can be used as the buffer for communication. For example, when the persistence unit 23 has made two entries persistent, the persistence unit 23 adds "2" as the skip value to an entry ahead of the two entries.

The reception unit 22 skips the persistence region 6 using the skip value when searching for the next entry. The reception unit 22 can keep data from being overwritten in the persistence region 6 by skipping the persistence region 6 using the skip value.

The determination unit 24 determines whether or not a persistence rate, in other words, a ratio of the persistence region 6 in the ring buffer 5 has exceeded a threshold T. The determination unit 24 determines the threshold T by the following equation:

$$T=(N*T_M+N*P*M)/S$$

When the ratio of the persistence region 6 exceeds the threshold T, a buffer shortage occurs and communication processing using the ring buffer 5 is stopped. Therefore, when the ratio of the persistence region 6 exceeds the threshold T, the reception processing unit 20 performs evacuation processing for evacuating the data in the persistence region 6 of the ring buffer 5.

In the case where the determination unit 24 determines that the ratio of the persistence region 6 has exceeded the threshold T in the ring buffer 5, the selection unit 25 selects a method of evacuating data in the persistence region 6 from two methods. The first method is a method of creating a new ring buffer 5 and using the created ring buffer 5 for subsequent communication. The second method is a method of evacuating the data stored in the persistence region 6 to another region of the storage unit 21 and reusing the persistent region for communication.

Figure 3:
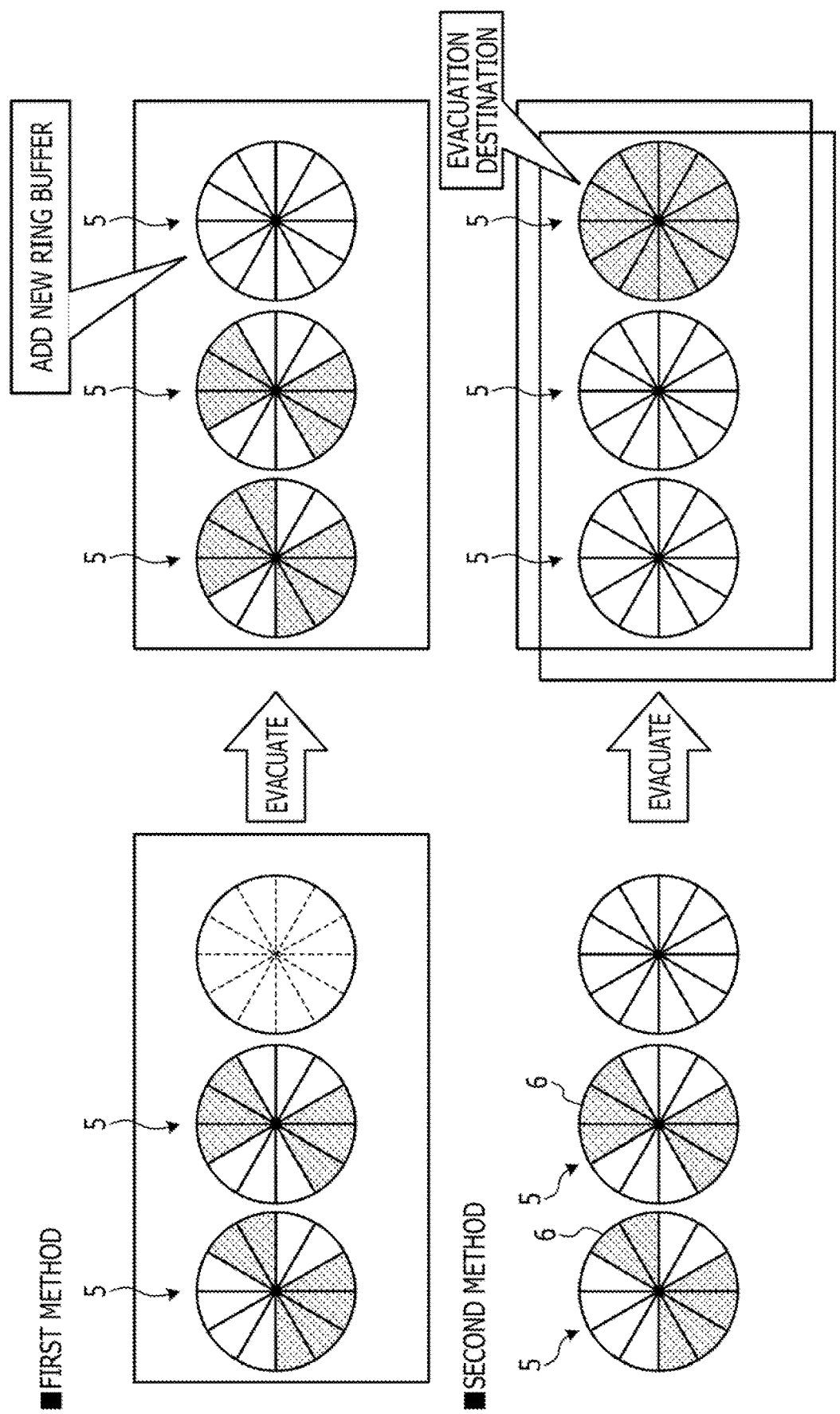
FIG. 3 is a diagram illustrating an example of two evacuation methods.

FIG. 3 is a diagram illustrating an example of two evacuation methods. As illustrated in FIG. 3, in the first method, a new ring buffer 5 is added. In FIG. 3, a third ring buffer 5 is added. In the second method, the data in the persistence region 6 is evacuated in another region, and the persistence region 6 in the ring buffer 5 is reused for communication. That is, the skip value is removed. In FIG. 3, the data in the six persistent entries are respectively evacuated from the two ring buffers 5, and the data in the total of twelve entries are evacuated.

The selection unit 25 selects the first method in the case where the number of received messages/second of the server 2 is larger than a threshold L and an enough free region for securing the new ring buffer 5 is present in the storage unit 21. The reason is to suppress an influence of a load due to evacuation on the processing of server 2. Note that the threshold L is determined on the basis of characteristics of the data transfer system 3, minimum performance requirements to be satisfied by the data transfer system 3, and the like.

In the case where the number of received messages/second of the server 2 is larger than the threshold L and the enough free region for securing the new ring buffer 5 is not present in the storage unit 21, the processing is not able to be performed, and thus the selection unit 25 requests the reception unit 22 to return an error to a newly received message.

In the case where the number of received messages/second of the server 2 is not larger than the threshold L and the persistence rate falls below the threshold T when the data in the persistence region 6 in the one or more ring buffers 5 is evacuated, the selection unit 25 selects the second method.

In the case where the number of received messages/second of the server 2 is not larger than the threshold L and the persistence rate does not fall below the threshold T even when the data in the persistence region 6 in the one or more ring buffers 5 is evacuated, the selection unit 25 selects the first method. Note that, in the case where the enough free region for securing the new ring buffer 5 is not present in the storage unit 21, the selection unit 25 requests the reception unit 22 to return an error to a newly received message.

In the case where the first method has been selected by the selection unit 25, the first evacuation unit 26 performs evacuation by the first method. That is, the first evacuation unit 26 newly creates the ring buffer 5 and switches the buffer for communication to the created ring buffer 5.

In the case where the second method has been selected by the selection unit 25, the second evacuation unit 27 performs evacuation by the second method. That is, the second evacuation unit 27 evacuates the data stored in the persistence region 6 to another region of the storage unit 21 and reuses the persistence region 6 for communication. Furthermore, the second evacuation unit 27 removes the skip value of the entry from which the data has been evacuated.

Figure 4:
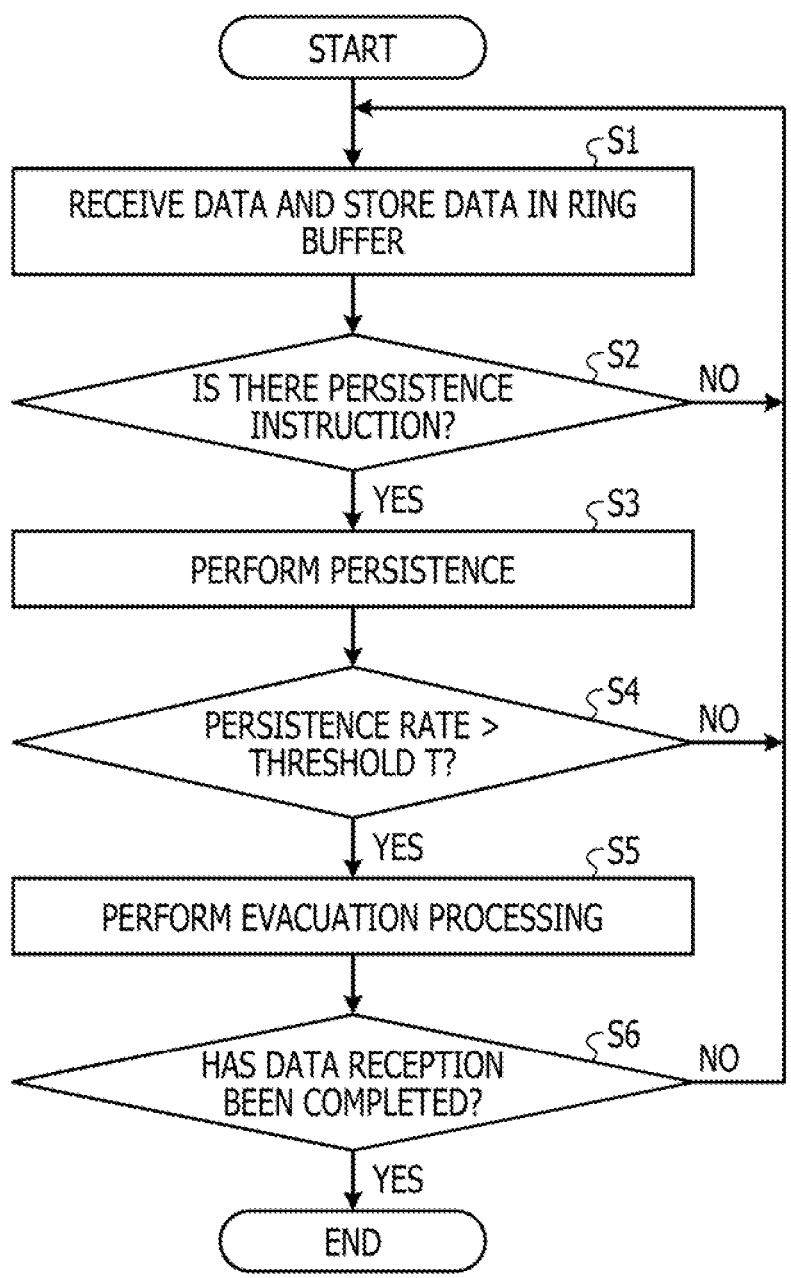
FIG. 4 is a flowchart illustrating a flow of reception processing by a reception processing unit.

Next, a flow of reception processing by the reception processing unit 20 will be described. FIG. 4 is a flowchart illustrating a flow of reception processing by the reception processing unit 20. As illustrated in FIG. 4, the reception processing unit 20 receives the data and stores the data in the ring buffer 5 (step S1). Then, the reception processing unit 20 determines whether or not there is a persistence instruction (step S2), and the reception processing unit 20 returns to step S1 in the case where there is no persistence instruction.

On the other hand, in the case where there is the persistence instruction, the reception processing unit 20 performs persistence (step S3) and determines whether or not the persistence rate is larger than the threshold T (step S4).

Then, in the case where the persistence rate is not larger than the threshold T, the reception processing unit 20 returns to step S1.

On the other hand, in the case where the persistence rate is larger than the threshold T, the reception processing unit 20 performs evacuation processing for evacuating the data in the persistence region 6 (step S5). Then, the reception processing unit 20 determines whether or not data reception has been completed (step S6), and returns to step S1 in the case where the data reception has not been completed or terminates the reception processing in the case where the data reception has been completed.

The reception processing unit 20 performs the evacuation processing in the case where the persistence rate is larger than the threshold T in this manner, thereby stopping the reception buffer shortage.

Figure 5:
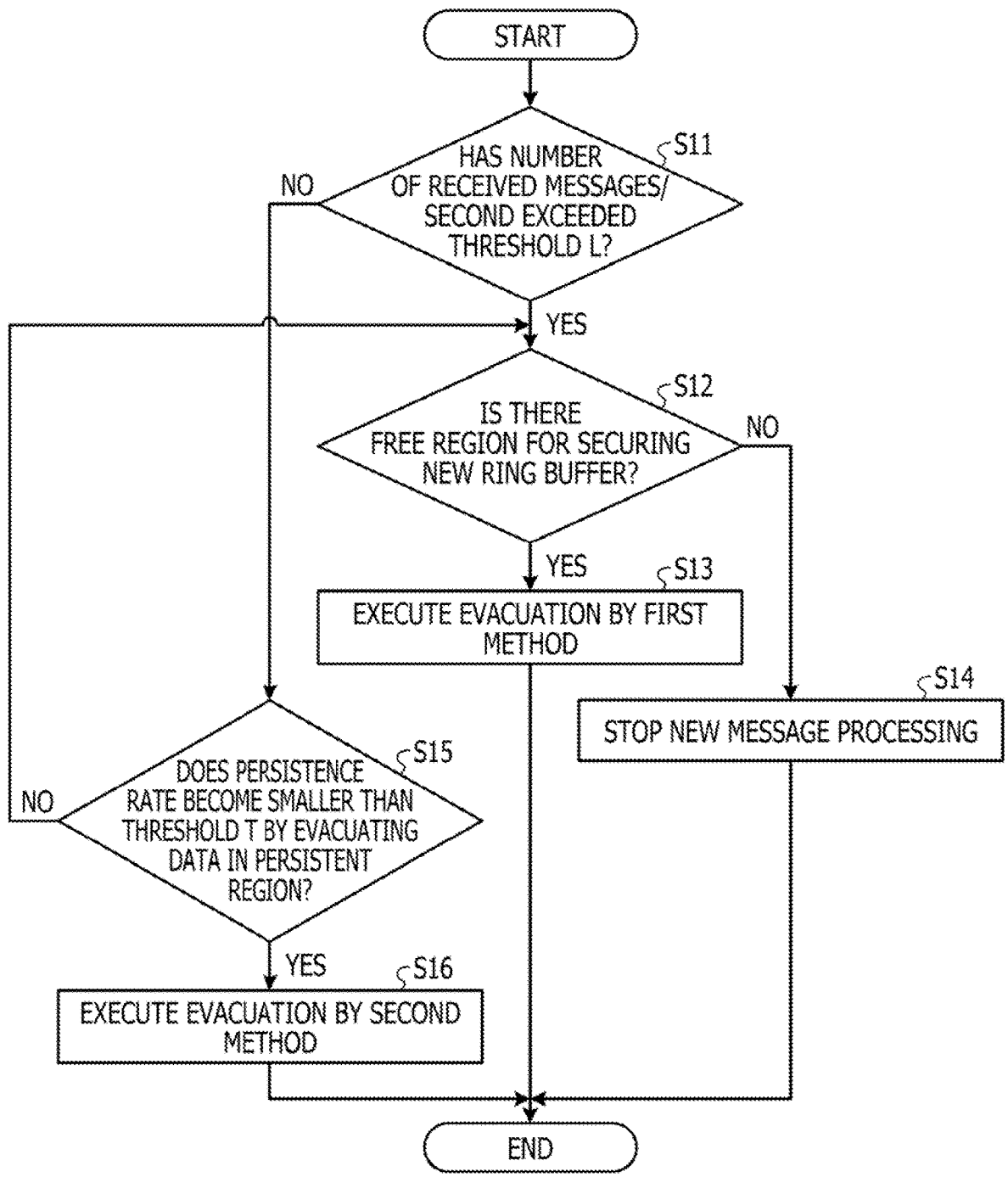
FIG. 5 is a flowchart illustrating a flow of evacuation processing.

FIG. 5 is a flowchart illustrating a flow of the evacuation processing. As illustrated in FIG. 5, the reception processing unit 20 determines whether or not the number of received messages/second of the server 2 has exceeded the threshold L (step S11), and determines whether or not the free region for securing a new ring buffer 5 is present in the case where the number of received messages/second has exceeded the threshold L (step S12).

Then, the reception processing unit 20 executes evacuation by the first method in the case where the free region for securing the new ring buffer 5 is present (step S13) or stops the new message processing in the case where the free region for securing the new ring buffer 5 is not present (step S14).

Furthermore, in the case where the number of received messages/second of the server 2 has not exceeded the threshold L, the reception processing unit 20 determines whether or not the persistence rate becomes smaller than the threshold T by evacuating the data in the persistence region 6 (step S15). Then, the reception processing unit 20 executes evacuation by the second method in the case where the persistence rate becomes smaller than the threshold T (step S16) or moves to step S12 in the case where the persistence rate does not become smaller than the threshold T.

The reception processing unit 20 determines the evacuation method on the basis of the number of received messages/second, the free region in the non-volatile memory, and the persistence rate after evacuation in this manner, thereby appropriately evacuating the data in the persistence region 6.

Figure 6:
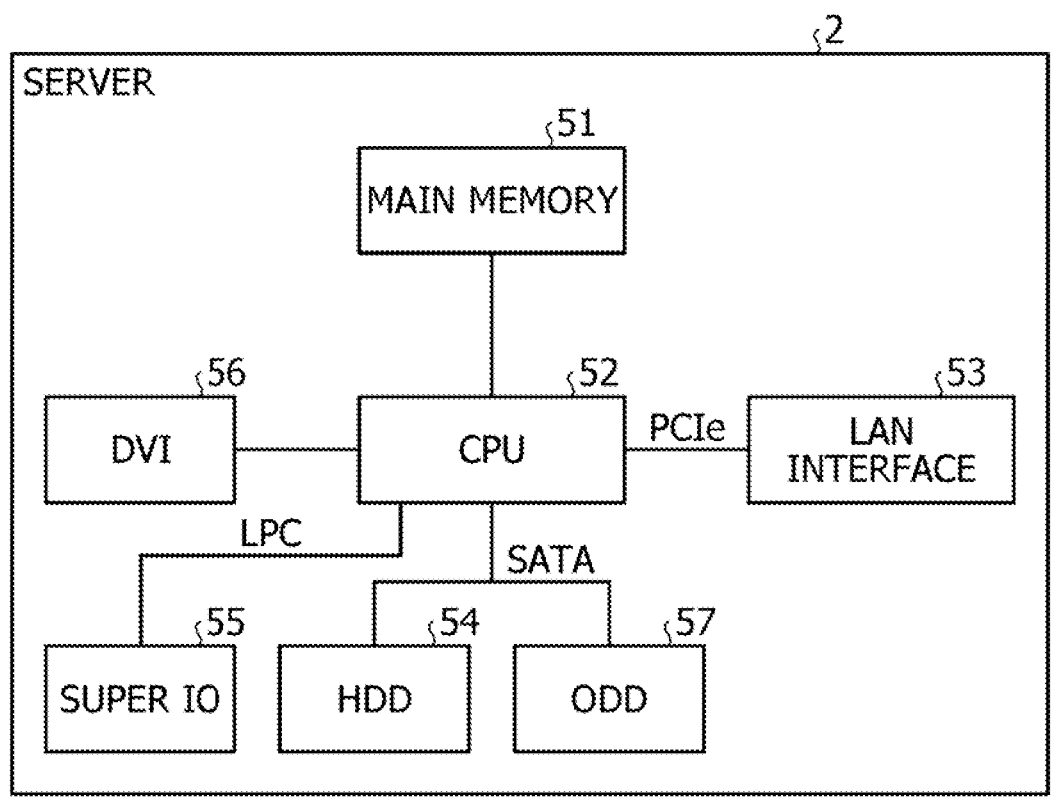
FIG. 6 is a diagram illustrating a hardware configuration of a server.

Next, a hardware configuration of the server 2 will be described. FIG. 6 is a diagram illustrating a hardware configuration of the server 2. As illustrated in FIG. 6, the server 2 includes a main memory 51, a central processing unit (CPU) 52 as an example of a processor, a local area network (LAN) interface 53, and a hard disk drive (HDD) 54. Furthermore, a computer 50 includes a super input output (IO) 55, a digital visual interface (DVI) 56, and an optical disk drive (ODD) 57.

The main memory 51 is a memory that stores a program, a halfway result of execution of the program, and the like. A part of the main memory 51 is a non-volatile memory. The ring buffer 5 is created in the non-volatile memory. The CPU 52 is a central processing unit that reads and executes the program from the main memory 51. The CPU 52 includes a chipset having a memory controller.

The LAN interface 53 is an interface for connecting the server 2 to another computer via a LAN. The HDD 54 is a disk device that stores programs and data, and the super IO 55 is an interface for connecting an input device such as a mouse and a keyboard. The DVI 56 is an interface for connecting a liquid crystal display device, and the ODD 57 is a device for reading and writing data to and from a DVD or compact disc recordable (CD-R).

The LAN interface 53 is connected to the CPU 52 by PCI express (PCIe), and the HDD 54 and the ODD 57 are connected to the CPU 52 by serial advanced technology attachment (SATA). The super IO 55 is connected to the CPU 52 by low pin count (LPC).

Then, the reception processing program executed by the server 2 is stored in a CD-R as an example of a recording medium that can be read by the server 2 and is read from the CD-R by the ODD 57 and installed to the server 2. Alternatively, the reception processing program is stored in a database of another computer system or the like connected via the LAN interface 53 and is read from the database or the like and is installed to the server 2. Then, the installed reception processing program is stored in the HDD 54, is read to the main memory 51, and is executed by the CPU 52.

As described above, in the embodiment, the persistence unit 23 makes a part of the ring buffer 5 persistent on the basis of the instruction of the reception application, and the determination unit 24 determines whether or not the persistence rate has exceeded the threshold T. Then, in the case where the determination unit 24 determines that the persistence rate has exceeded the threshold T, the selection unit 25 selects the method of evacuating the data in the persistence region 6 on the basis of the number of received messages/second of the server 2 and the free region in the storage unit 21. Therefore, the reception processing unit 20 can reduce the time needed for copying the data in the ring buffer 5 and speed up the RDMA.

Furthermore, in the embodiment, the selection unit 25 selects either the first method of creating the new ring buffer 5 or the second method of evacuating the data in the persistence region 6 of the ring buffer 5 to another region. Therefore, the time needed for copying the data in the ring buffer 5 can be reduced.

Furthermore, in the embodiment, the selection unit 25 selects the first method in the case where the number of received messages/second of the server 2 exceeds the threshold L and the free region for securing the new ring buffer 5 is present in the non-volatile memory. Meanwhile, the selection unit 25 selects the second method in the case where the number of received messages/second of the server 2 does not exceed the threshold L and the persistence rate becomes smaller than the threshold T by evacuating the data in the persistence region 6 Therefore, the reception processing unit 20 can suppress the influence of the evacuation on the processing of the server 2.

Furthermore, in the embodiment, the determination unit 24 determines the threshold T on the basis of the size S of the ring buffer 5, the number of messages arriving per second by RDMA communication, the time needed for processing one message, the ratio of received messages to be made persistent, and the time needed for evacuating data from the ring buffer 5. Therefore, the reception processing unit 20 can stop occurrence of the buffer shortage in RDMA communication.

Furthermore, in the embodiment, when the persistence unit 23 has made the entry of the ring buffer 5 persistent, the persistence unit 23 adds the skip value to the entry ahead of the persistent entry. Then, the reception unit 22 searches for an entry for storing the received data using the skip value. Therefore, the reception unit 22 can keep the data in the persistence region 6 from being overwritten.

Furthermore, in the embodiment, the case where the client 1 transfers the data to the server 2 has been described, but in the data transfer system 3, for example, the other two devices may transfer the data such as the server 2 transferring the data to the client 1.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
   memory including a non-volatile memory and a ring buffer; and
   a processor coupled to the memory, the processor being configured to perform processing, the processing including:
   executing a persistence processing configured to set a first region being a part of the ring buffer to be a persistent mode, a remaining portion of the ring buffer other than the first region being a buffer to be used in remote direct memory access (RDMA) to the non-volatile memory accessible in an equal manner to a dynamic random access memory (DRAM), the persistent mode being a mode so as not to allow data stored in the first region of the ring buff to be overwritten;
   executing a determination processing configured to determine whether a ratio of the first region with respect to whole of the ring buffer has exceeded a first threshold; and
   in response that the determination processing determines that the ratio has exceeded the first threshold, executing a selection processing configured to select a method of evacuating the data stored in the first region, on the basis of a received data amount in the RDMA and a free region in the non-volatile memory.

2. The information processing device according to claim 1, wherein the selection processing is configured to select either a first method or a second method, the first method being a method of newly creating a ring buffer, the second method being a method of evacuating the persistent received data as the method of evacuating the persistent received data.

3. The information processing device according to claim 2, wherein the selection processing is configured to:
   select the first method in a case where the received data amount of the information processing device exceeds a second threshold and the free region in the non-volatile memory is larger than the ring buffer; and
   select the second method in a case where a communication amount of the information processing device does not exceed the second threshold and a ratio of the persistent region becomes smaller than the first threshold by evacuating the received data in the persistent region.

4. The information processing device according to claim 1, wherein the determination processing is configured to determine the first threshold as a value with which the ring buffer becomes not insufficient on the basis of the received data amount, a processing time for the received data, a ratio of persistent received data, a time needed for evacuating the received data in the ring buffer, and a size of the ring buffer, and makes a determination using the determined first threshold.

5. The information processing device according to claim 1, wherein
   the persistence processing is configured to add a skip value to be used when searching the ring buffer for a next entry to an entry ahead of a persistent entry, and
   the processing further includes
   searching for an entry for storing the received data, by using the skip value.

6. A non-transitory computer-readable storage medium for storing a reception processing program which causes a processor of a computer having a non-volatile memory and a ring buffer to perform processing, the processing comprising:
   executing a persistence processing configured to set a first region being a part of the ring buffer to be a persistent mode, a remaining portion of the ring buffer other than the first region being a buffer to be used in remote direct memory access (RDMA) to the non-volatile memory accessible in an equal manner to a dynamic random access memory (DRAM), the persistent mode being a mode so as not to allow data stored in the first region of the ring buff to be overwritten;
   executing a determination processing configured to determine whether a ratio of the first region with respect to whole of the ring buffer has exceeded a first threshold; and
   in response that the determination processing determines that the ratio has exceeded the first threshold, executing a selection processing configured to select a method of evacuating the data stored in the first region, on the basis of a received data amount in the RDMA and a free region in the non-volatile memory.

7. The non-transitory computer-readable storage medium according to claim 6, wherein the selection processing is configured to select either a first method or a second method, the first method being a method of newly creating a ring buffer, the second method being a method of evacuating the persistent received data as the method of evacuating the persistent received data.

8. The non-transitory computer-readable storage medium according to claim 7, wherein the selection processing is configured to:
   select the first method in a case where the received data amount of the information processing device exceeds a second threshold and the free region in the non-volatile memory is larger than the ring buffer; and
   select the second method in a case where a communication amount of the information processing device does not exceed the second threshold and a ratio of the persistent region becomes smaller than the first threshold by evacuating the received data in the persistent region.

9. The non-transitory computer-readable storage medium according to claim 6, wherein
   the persistence processing is configured to add a skip value to be used when searching the ring buffer for a next entry to an entry ahead of a persistent entry, and
   the processing further includes
   searching for an entry for storing the received data, by using the skip value.

* * * * *